United States Patent
Lo et al.

(10) Patent No.: US 7,362,771 B1
(45) Date of Patent: Apr. 22, 2008

(54) REDUCED LATENCY FIFO

(75) Inventors: William Lo, Cupertino, CA (US);
Samuel Er-Shen Tang, Cupertino, CA (US); Sabu Ghazali, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 1098 days.

(21) Appl. No.: 10/158,337

(22) Filed: May 30, 2002

(51) Int. Cl.
*H04L 12/54* (2006.01)

(52) U.S. Cl. ............ 370/429; 370/401; 370/412; 710/52; 710/57

(58) Field of Classification Search .......... None
See application file for complete search history.

(56) References Cited

U.S. PATENT DOCUMENTS

| | | | |
|---|---|---|---|
| 5,959,994 A | 9/1999 | Boggs et al. | |
| 6,195,332 B1 | 2/2001 | Tang | |
| 6,195,346 B1 * | 2/2001 | Pierson, Jr. | 370/352 |
| 6,654,383 B2 * | 11/2003 | Haymes et al. | 370/466 |
| 7,127,653 B1 * | 10/2006 | Gorshe | 714/746 |
| 2001/0017723 A1 | 8/2001 | Chang et al. | |
| 2003/0058894 A1 * | 3/2003 | Feuerstraeter et al. | 370/518 |
| 2003/0189925 A1 * | 10/2003 | Wellbaum et al. | 370/372 |
| 2003/0217215 A1 * | 11/2003 | Taborek et al. | 710/305 |

* cited by examiner

*Primary Examiner*—Duc Ho

(57) ABSTRACT

A First-In-First-Out (FIFO) block to buffer a packet having a size is presented. The FIFO block includes a receiver to receive a data frame including the packet and overhead information, and to extract the packet from the data frame. A buffer has a plurality of memory locations to store the packet in a FIFO configuration. A buffer manager, in response to detecting a buffer low packet condition, stalls reads of the packet from the buffer.

41 Claims, 5 Drawing Sheets

US 7,362,771 B1

REDUCED LATENCY FIFO

TECHNICAL FIELD

This invention relates to transceivers for interfacing between networks.

BACKGROUND

In systems where information is communicated between different networks some form of interface device is typically employed to reconcile differences between the networks. The differences may include differences in frequency between the networks as well as configuration of data packets. In addition to reconciling the network differences the interface device must typically comply with industry standards that limit the maximum latency of information exchanged between the networks.

SUMMARY

In one aspect, a First-In-First-Out (FIFO) block to buffer a packet having a size is presented. The FIFO block includes a receiver to receive a data frame including the packet and overhead information, and to extract the packet from the data frame. A buffer has a plurality of memory locations to store the packet in a FIFO configuration. A buffer manager, in response to detecting a buffer low packet condition, stalls reads of the packet from the buffer.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
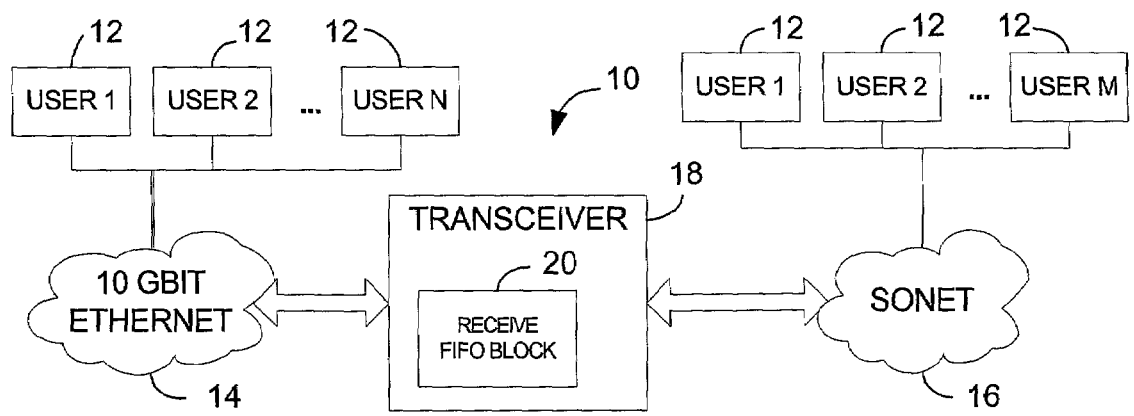
FIG. 1 is a block diagram of a communication system.

FIG. 1 shows a communication system 10 for communicating information between multiple users 12 connected to separate networks 14 and 16. The networks 14 and 16 are preferably a 10 Gigabit Ethernet (10 GbE) network 14 and a Synchronous Optical NETwork (SONET) 16 that may support a WIS (WAN (wide area network) interface sublayer) mode. However, any combination including one or more packet-based networks may be employed. A transceiver 18 is coupled between the networks 14 and 16. In one direction, the transceiver 18 converts a data stream from an Attachment Unit Interface (XAUI) to supply a 10 Gigabit data stream to the SONET 16. In the other direction, the transceiver 18 converts a 10 Gigabit data stream from the SONET 16 to supply a four-lane XAUI data stream to the 10 GbE network 14. The transceiver 18 includes a receive First-In-First-Out (FIFO) block 20 to extract data from WIS frames to be transmitted as standard Ethernet packets.

Figure 2:
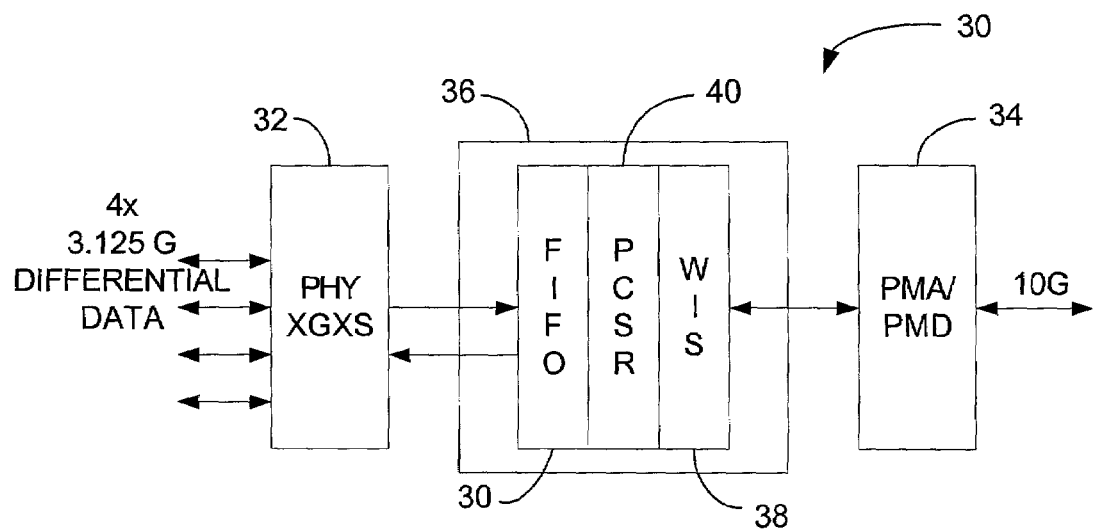
FIG. 2 is a block diagram of a transceiver to interface between a SONET network and a 10 GigaBit Ethernet network.

FIG. 2 shows a transceiver 30 to communicate information in the WIS mode between a SONET network and a 10 GbE Network. The transceiver 30 may include a physical layer device (PHY) 32 to provide packet delineation and scrambling for the 10 GbE interface. Physical medium dependent (PMD) and physical medium attachment (PMA) PHY sublayers provide the physical interface for the SONET. Packets flowing from the SONET interface may be enclosed in WIS frames and flow into a receiver assembly 36 which extracts the enclosed data from the WIS frames and forwards it for transmission as Standard Ethernet Packets to the 10 GbE network. The receiver assembly 36 may include a WIS 38 to descramble the incoming data and to remove WIS framing overhead. A physical coding sublayer (PCSR) 40 may provide packet delineation and another level of scrambling. A first-in-first-out (FIFO) block 42 receives the data frame and buffers packet data that is subsequently processed into a standard Ethernet packet to be transmitted onto the 10 GbE network.

Figure 3:
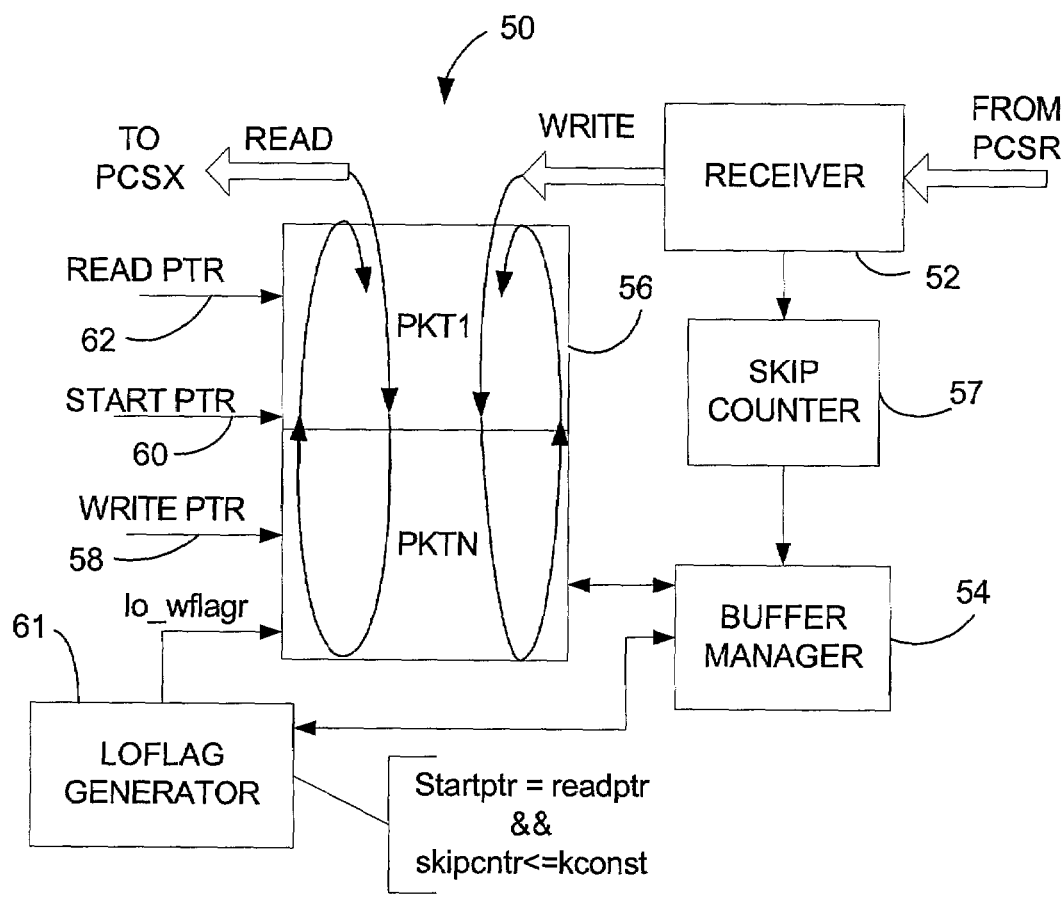
FIG. 3 is a block diagram of a FIFO block.

FIG. 3 shows a FIFO block 50 to buffer data carried in a WIS frame received from a SONET network through a PCSR receiver 40 to a 10 Gigabit Attachment Unit Interface (XAUI). The FIFO block 50 may reconcile frequency differences between the XAUI side of the interface and the 10 GbE side. In addition, the FIFO block 50 may buffer the packet data to compensate for dead times introduced by adding and deleting overhead. Ethernet packet and inter-packet gaps may be communicated from the PCSR 40 to the FIFO block 50. A receiver 52 may extract the packet from the WIS frame and write to a buffer 56 having multiple memory locations. A skip counter 57 counts skip cycles associated with the packet. Skip cycles may be any clock cycles during which data other than a packet is clocked such as deleting overhead, gear box stalls, and frequency differences. The maximum packet size may be predetermined to be a maximum packet size to be supported such as standard 1518 Ethernet or Jumbo 10k packets. Packets are stored in the buffer 56 in a first-in-first-out configuration. A write pointer 58 points to a current location within the buffer 56 at which a packet is being written. A start pointer 60 points to a location in the buffer 56 at which the last received start data associated with a packet is located. A read pointer 62 points to the next buffer memory location from which data is read and transmitted to a physical coding sublayer (PCSX) within the XAUI side PHY 32. A buffer manager 54 may monitor the buffer 56 for a low packet condition. In response to determining a low packet condition exists, the buffer manager 54 may set a lo_wflagr 61 and stall reads from the buffer 56 to avoid increased latency in processing the packet for transmission over the other network. Increased latency may result in conventional systems, from for example a large packet spilling over from one WIS frame line to another WIS frame line. Processing the extra overhead bits due to the spillover may double the latency.

A low packet condition may exist if there are no full packets in the buffer 56, the read pointer 62 is pointing to a start data location, and the counted skip cycles are less than a predetermined count constant.

In one aspect, the FIFO block 50 preferably operates according to the following rules.

Write Rules

Write Rule 1—An entire 10 Gigabit media independent interface (XGMII) word is either written into the FIFO or it is not.

Write Rule 2—At any given clock cycle one of the following four events will occur;
  A) both XGMII words are written into the FIFO memory
  B) only the second XGMII word is written into a holding register and nothing is written into the FIFO memory
  C) neither of the XGMII words are written into the FIFO memory
  D) the word in the holding register and the first XGMII word are written into FIFO memory and the second XGMII word is written into the holding register Write Rule 3—The order of the XGMII words is preserved in the FIFO.

Write Rule 4—If two XGMII words are to be written into the RAM, they are preferably written in 1 cycle.

Write Rules 5 and 6 apply only in 10GBASE-R mode, and Write Rule 11 supercedes Write Rules 5 and 6.

Write Rule 5—If the FIFO is not above the high water mark and is not below the low watermark the following idle rule may apply.

If {non-idle, don't care}, {idle, idle}, {idle, idle}, . . . {idle, idle}, {don't care, none-idle} 2XGMII data is presented to the FIFO then only the first pair of {idle, idle} is written into the FIFO memory. Subsequent consecutive {idle, idle} are not written into the FIFO.

An idle XGMII word is defined to be /idle/idle/idle/idle/. Note that /terminate/idle/idle/idle/does not count as an idle XGMII word for the purpose of this rule (this rule prevents the FIFO from filling up with idle symbols so that the rate mismatch can be reconciled while running in the 10GBASE-W mode).

Write Rule 6—If the FIFO is not above the high water mark and is not below the low watermark, the following sequence rule may apply.

If {non-sequence X, don't care}, {sequence X, sequence X}, {sequence X, sequence X}, . . . {sequence X, sequence X} {don't care, non-sequence X} 2XGMII data is presented to the FIFO, then only the first pair of {sequence X, sequence X} is written into the FIFO memory. Subsequent consecutive {sequence X, sequence X} are not written into the FIFO. Note, sequence X must be identical sequence words.

A sequence XGMII word is defined to be /sequence/xx/yy/zz/. A matching sequence implies the xx,yy, and zz bytes of the sequence XGMII words match each other (this rule prevents the FIFO from filling up with sequence symbols so that the rate mismatch can be reconciled while running in the 10GBASE-W mode).

Write Rules 7-10 are superceded by Write Rule 11.

Write Rule 7—If the FIFO has reached the high water mark, the following idle rule applies;
  A) Non-idle, idle, non-idle. Write into FIFO memory as presented.
  B) Non-idle, idle, idle, non-idle. One and only one idle word must be dropped. Note that this will require the holding register referred in rule 2B and 2D.
  C) Non-idle, idle, idle, idle, non-idle. One and only one idle word must be dropped. Note that this will require the holding register referred in rule 2B and 2D.
  D) Non-idle, idle, idle, idle, idle, non-idle. Two idle words must be dropped. There are two cases here. One case is {idle, idle}, {idle, idle} in which case write rule 5 applies. The other case is {Non-idle, idle}, {idle, idle}, {idle, Non-idle}.
  E) If 5 or more idle XGMII words are seen between non-idle XGMII words then write rule 5 applies. It is preferable to revert back to rule 2A and 2C as soon as possible by dropping the idle word stored in the holding register whenever write rule 6 applies. Note that if rule 2B and 2D are already in effect then applying rule 8B and 8C should toggle the FIFO back into rule 2A and 2C.

Write Rule 8—If the FIFO has reached the high water mark the following sequence rule may apply. This rule is similar to write rule 7 except instead of idles matching sequence words are considered.

Write Rule 9—If the FIFO indicates overflow, then the FIFO may write an error XGMII word followed by five idle XGMII words. No further writes are allowed until the overflow condition ends and an idle or sequence XGMII word is seen. The wait for idle or sequence XGMII word prior to resuming writing prevents a truncated packet from being injected onto the network.

Write Rule 10—If the FIFO is below the low water mark then all bytes received are written into the FIFO even if they are idle or sequence symbols. Note that once the low water mark condition ends, write rules 5 and 6 apply.

Write Rule 11—The input 2XGMII word is ignored when the write enable is deasserted. The write pointer does not advance. Note that stopping the write may cause an underflow condition when in the 10GBASE-W mode, but read rule 2 and threshold rule 8 should prevent underflow from occurring.

Read Rules

Read Rule 1—FIFO output data must be valid exactly one cycle after the read enable is asserted. The FIFO outputs 2XGMII words at a time. Both XGMII words are valid data. The FIFO read pointer can only advance when the read enable is asserted.

Read Rule 2—If the FIFO is below the low water mark the following idle rule may apply.

The FIFO will continue to output data until a {don't care, idle} {idle, don't care}, or {sequence X, sequence X} is encountered.

If {don't care, idle} or {sequence X, sequence X} or (X, Terminate) is encountered, the FIFO outputs the 2XGMII word and then outputs {idle, idle} until the low watermark condition ends.

If {idle, don't care} is encountered, the FIFO outputs {idle, idle} until the low watermark condition ends before outputting the {idle, don't care}.

Note that in the case of {idle, idle} either case above can kick in depending on which is easier to implement.

Read Rule 3—In the WIS Mode, if the FIFO is empty and last date read is not terminate, then the FIFO outputs error symbols and freezes the read pointer until the empty condition ends.

Threshold Conditions

Implementation note: Threshold values defined below in threshold rules 5-8 and 10 should take into account the latency introduced by FIFO pointer synchronization.

Threshold Rule 1—If 10GBASE-W mode is selected, the pointer processing circuit should assert the high water flag if the difference between the read and write pointer is greater than or equal to FIFO depth −4. The high water flag should stay asserted until the difference drops to FIFO depth −6 to provide hysteresis. Note that the FIFO depth is a variable that is set depending on test mode or normal operation.

Threshold Rule 2—If 10GBASE-R is selected, the pointer processing circuit should assert the high water flag if the difference between the read and write pointers is greater than or equal to 12. The high water flag should stay asserted until the difference drops to 9 to provide hysteresis.

Threshold Rule 3—If 10GBASE-W is selected, the pointer processing circuit should assert the overflow flag if the difference between the read and write pointers is greater than or equal to FIFO depth −2. The overflow flag should stay asserted until the difference drops to FIFO depth −6 to provide hysteresis. Note that the two extra locations may be required for the write side to inject an error word plus 3 idle words. Note that the FIFO depth is a variable that may be set depending on test mode or normal operation.

Threshold Rule 4—If 10GBASE-R mode is selected, the pointer processing circuit should assert the overflow flag if the difference between the read and write pointers is greater than or equal to 15. The overflow flag should stay asserted until the difference drops to 4 to provide hysteresis.

Threshold Rule 5—This rule may apply only in 10GBASE-R mode. If 10GBASE-R is selected, the pointer processing circuit should assert the low water flag if the difference between the read and write pointers is less than or equal to 5. The low water flag should stay asserted until the difference increases to 8 to provide hysteresis.

Threshold Rule 6—If 10GBASE-W or 10GBASE-R is selected, the pointer processing circuit should assert the underflow flag if the difference between the read and write pointers is less than or equal to 2. The underflow flag should stay asserted until the difference increases to 8 to provide hysteresis.

Threshold Rule 7—If the FIFO is reset, then the read pointer and write pointer may be reset to the same value.

Rule 8—This rule only applies when in 10GBASE-W mode. The pointer processing circuit should always assert the low water flag until an entire packet is stored into the FIFO or until the skip counter >=kconst..

Implementation note: The FIFO should wait for kconst cycles to prevent underflow during the reception section/line/packet overhead of the SONET frame. However it is possible to send many small packets much shorter than kconstant x8 bytes with short inter-packet gap. The Start pointer should be implemented to track where the latest start symbol is written into the FIFO. If the read pointer is not the same as the Start pointer then it indicates that at least one entire packet is stored in the FIFO and the read pointer can advance.

Figure 4:
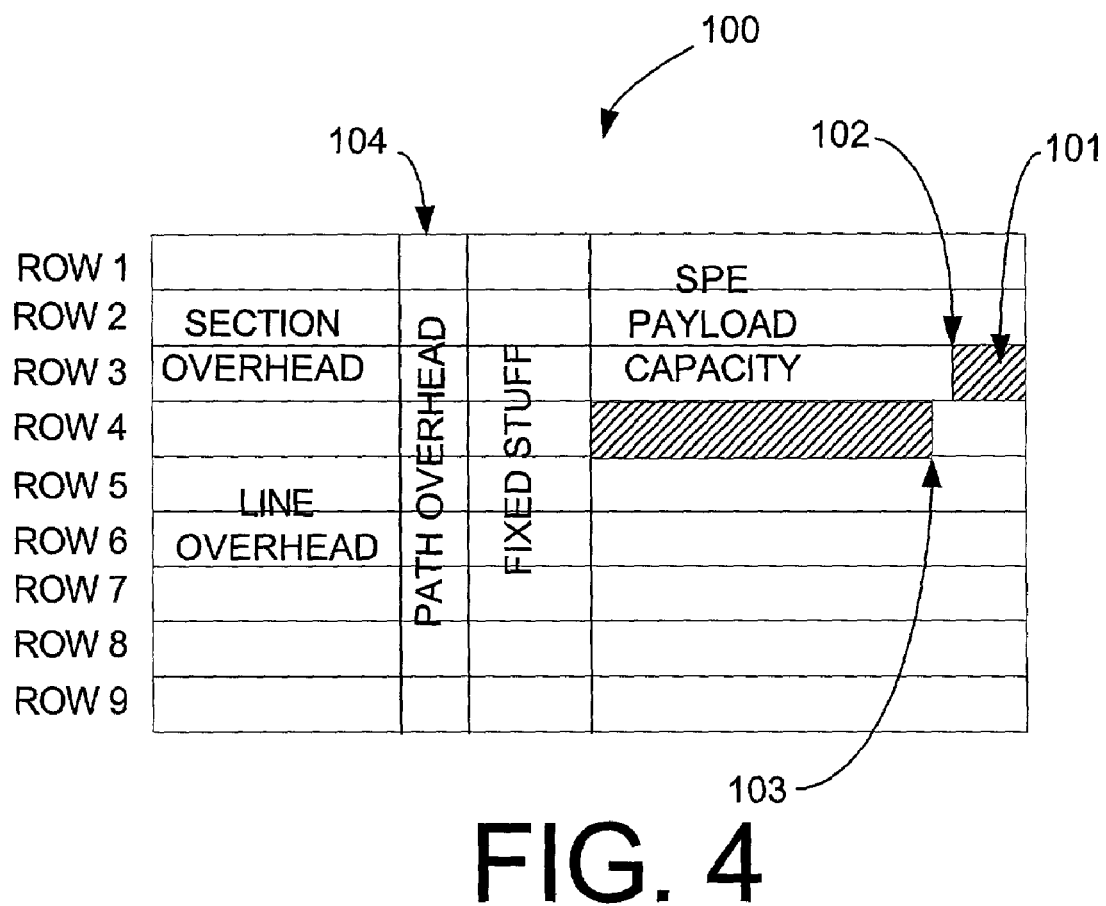
FIG. 4 is a diagram of a WIS (WAN (wide area network) interface sublayer) frame.

FIG. 4 shows a WIS frame 100 to transport a packet 101 from the SONET interface. The packet has a start data location 102 and an end data location 103. The packet may be embedded within overhead information 104 such as section, line and path overhead as well as fixed stuff.

Figure 5:
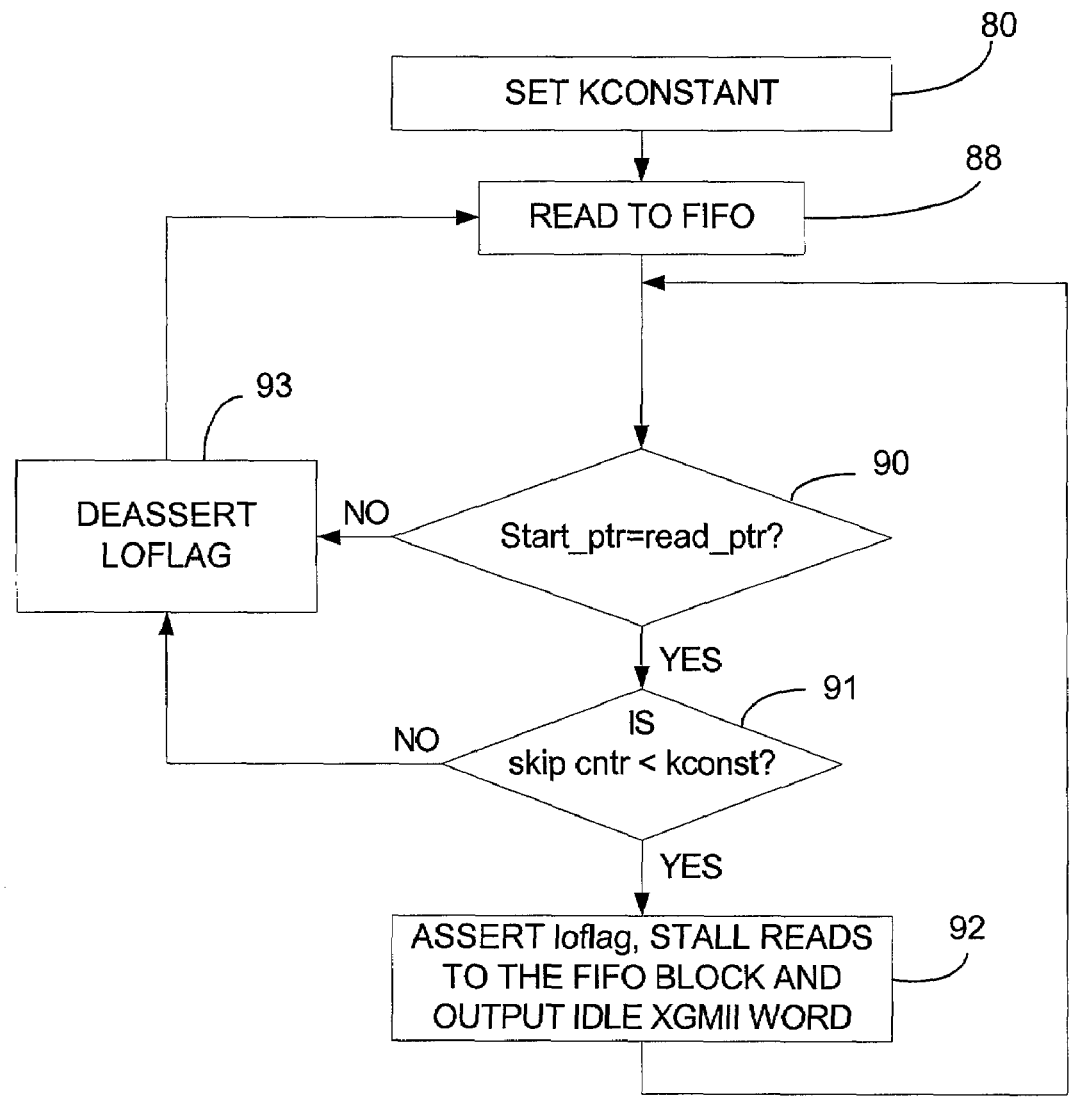
FIGS. 5 and 6 are flow diagrams of a process for transferring WIS frames to standard Ethernet packets.
Figure 6:
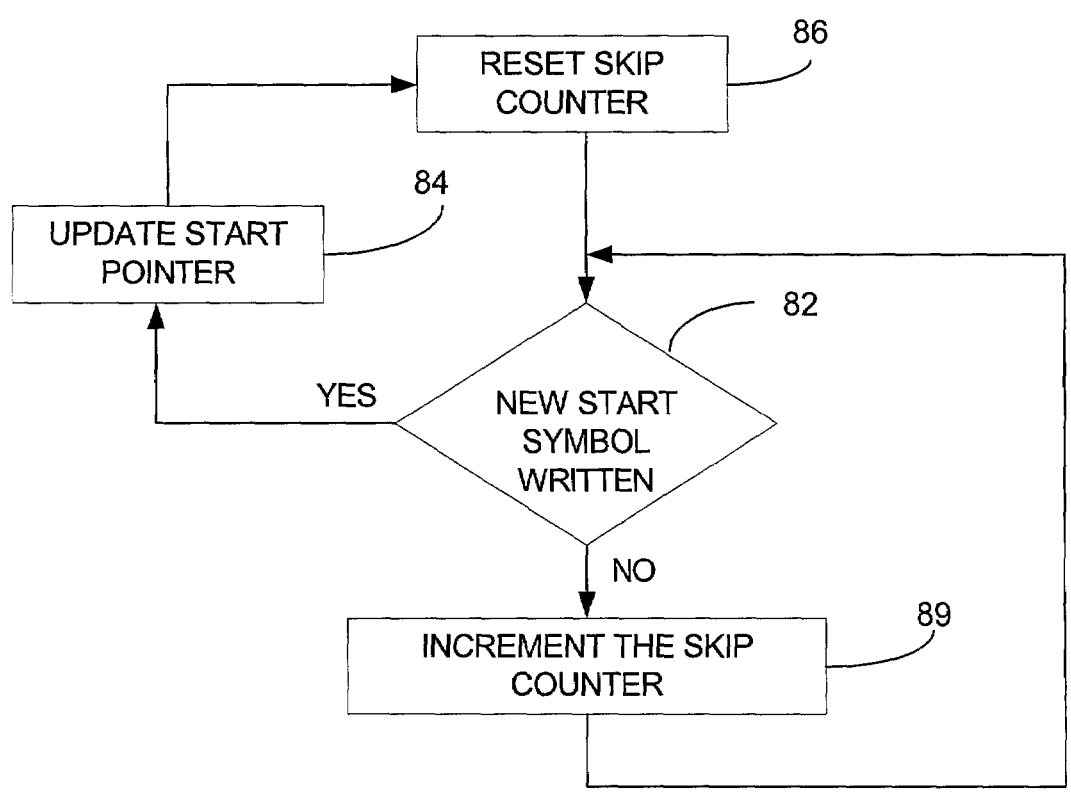

FIGS. 5 and 6 show a receive FIFO operation for transferring a packet from one network to another network. FIG. 5 shows a read operation buffer and FIG. 6 shows a write operation. The read and write operations may be either asynchronous or synchronous. At block 80, Kcount is selected to be used as a threshold value for a timing circuit such as a skip counter or a timer. Kcount may be selected and/or updated in response to beginning an operation such as before receiving a transmission. A switch (software or hardware) may be used select between two constants, K1 and K2, which correspond to the packet size. Kcount may be selected as a function of the packet size and including associated overhead cycles, gear box stall cycles, and frequency differences. For some packet sizes, Kcount may be reduced to the number of overhead cycles. For other packet sizes such as Jumbo packets, the gear box stall cycles may be predetermined and included in Kcount. The size of the buffer may also be selected as a function of the packet size. The timing circuit may be implemented in any manner such as hardware, software, and firmware. The timing circuit may count skip cycles as well as delay a time duration corresponding to the skip cycles.

Referring to FIG. 6, at block 82, a WIS frame including a packet is received from the PCSR. The data stream including the WIS frame is monitored for an indication of new start data. In response to new start data being written to the FIFO block, the FIFO block start pointer is updated at block 84, and the skip counter is reset to Kcount, block 86. Continuing to block 89, if new start data is not written at decision block 82, the skip counter may be incremented and control returns to decision block 82.

Referring to FIG. 5, at block 88, a read from the FIFO begins. During the read, the buffer may be monitored for a low packet condition. In response to detecting a low packet condition in the buffer, a low flag is triggered and further reads from the FIFO block may be stalled. At block 90, if the start pointer and read pointer do not point to the same location, the loflag is deasserted, block 93, and control returns to block 88. If the start pointer and read pointer do point to the same location, the skip counter is evaluated, block 91. If the skip counter is greater than or equal to Kconst, the loflag is deasserted at block 93 and control returns to block 88. If the skip counter is less than Kconst a low packet condition exists. In a low packet condition, the buffer does not include sufficient packet data to ensure that during a read a complete packet will be read. For example, the buffer may be in a low packet condition when there are no packets in the FIFO block and the skip counter has counted to less than Kcount. Reads may flow again, once a full packet is loaded in the buffer, such as for a small packet case, or for a large packet the skip counter has counted to Kcount.

A number of aspects of the invention have been described. Nevertheless, it will be understood that various modifications may be made without departing from the spirit and scope of the invention.

What is claimed is:

1. A First-In-First-Out (FIFO) block to buffer a packet having a size, comprising:
    a receiver to receive a data frame including the packet and overhead information, and to extract the packet from the data frame;
    a buffer having a plurality of memory locations to store the packet in a FIFO configuration; and
    a buffer manager, in response to detecting a buffer low packet condition, to stall reads of the packet from the buffer until at least one full packet is received in the buffer, wherein said buffer low packet condition occurs after a portion of the packet is stored in the buffer.

2. The FIFO block of claim 1 wherein the buffer manager, in response to not detecting the buffer low packet condition, restarts reads of the packet from the buffer.

3. The FIFO block of claim 1 wherein the data frame is compatible with a synchronous optical network (SONET).

4. A First-In-First-Out (FIFO) block to buffer a packet having a size, comprising:
    a receiver to receive a data frame including the packet and overhead information, and to extract the packet from the data frame;
    a buffer having a plurality of memory locations to store the packet in a FIFO configuration;
    a buffer manager, in response to detecting a buffer low packet condition, to stall reads of the packet from the buffer, wherein the buffer manager, in response to not detecting the buffer low packet condition, restarts reads of the packet from the buffer; and
    the buffer manager to compare the counted skip cycles to a count constant to determine a skip count status.

5. The FIFO block of claim 4 further comprising a timer that includes a skip counter.

6. The FIFO block of claim 4 wherein the buffer includes a read pointer to point at a read location from which the packet is read, a write pointer to point to a write location at which the packet is currently written, and a start pointer to point to a last start of the packet; and
wherein the buffer manager detecting the buffer low packet condition includes determining the buffer does not include a full packet, the read pointer is pointing to the start pointer, and the counted skip cycles are less than the count constant.

7. The FIFO block of claim 6 wherein reads of the packet from the buffer are restarted in response to determining the buffer includes a full packet.

8. The FIFO block of claim 6 wherein reads of the packet from the buffer are restarted in response to determining the counted skip cycles is equal to the count constant.

9. A transceiver comprising:
a Wide Area Network Interface Sublayer (WIS) to add framing to a packet having a size;
a Physical Coding Sublayer (PCSR) to delineate the packet; and
a first-in-first-out (FIFO) block to buffer the packet for processing into a network format and transmission, the FIFO block to stall reads of the packet in response to detecting a buffer low packet condition, wherein said buffer low packet condition exists when a portion of the packet is in the buffer.

10. The transceiver of claim 9 wherein the FIFO block comprises;
a receiver to receive a data frame including the packet and overhead information, and to extract the packet from the data frame;
a buffer having a plurality of memory locations to store the packet in a FIFO configuration; and
a buffer manager, in response to detecting the buffer low packet condition, to stall reads of the packet from the buffer.

11. The transceiver of claim 10 wherein the buffer manager, in response to not detecting the buffer low packet condition, restarts reads of the packet from the buffer.

12. The transceiver of claim 10 wherein the data frame is compatible with a synchronous optical network (SONET).

13. A transceiver comprising:
a Wide Area Network Interface Sublayer (WIS) to add framing to a packet having a size;
a Physical Coding Sublayer (PCSR) to delineate the packet;
a first-in-first-out (FIFO) block to buffer the packet for processing into a network format and transmission, the FIFO block to stall reads of the packet in response to detecting a buffer low packet condition,
wherein the FIFO block comprises a receiver to receive a data frame including the packet and overhead information, and to extract the packet from the data frame;
a buffer having a plurality of memory locations to store the packet in a FIFO configuration;
a buffer manager, in response to detecting the buffer low packet condition, to stall reads of the packet from the buffer, wherein the buffer manager, in response to not detecting the buffer low packet condition, restarts reads of the packet from the buffer; and
a timer to count skip cycles corresponding to the overhead information; and
the buffer manager to compare the counted skip cycles to a count constant to determine a skip count status.

14. The transceiver of claim 13 wherein the timer includes a skip counter.

15. The transceiver of claim 13 wherein the buffer includes a read pointer to point at a read location from which the packet is read, a write pointer to point to a write location at which the packet is currently written, and a start pointer to point to a last start of the packet in the buffer; and
wherein the buffer manager detecting the buffer low packet condition includes determining the buffer does not include a full packet, the read pointer is pointing to the start pointer, and the counted skip cycles are less than the count constant.

16. The transceiver of claim 15 wherein reads of the packet from the buffer are restarted in response to determining the buffer includes a full packet.

17. The transceiver of claim 15 wherein reads of the packet from the buffer are restarted in response to determining the counted skip cycles is equal to the count constant.

18. A First-In-First-Out (FIFO) block to buffer a packet having a size, comprising:
means for receiving a data frame including the packet and overhead information, and to extract the packet from the data frame;
means for buffering having a plurality of memory locations to store the packet in a FIFO configuration; and
means for managing, in response to detecting a buffer low packet condition, to stall reads of the packet from the buffer until at least one full packet is received in the buffer, wherein said buffer low packet condition occurs after a portion of the packet is stored in said means for buffering.

19. The FIFO block of claim 18 wherein the managing means, in response to not detecting the buffer low packet condition, restarts reads of the packet from the buffer.

20. The FIFO block of claim 18 wherein the data frame is compatible with a synchronous optical network (SONET).

21. A First-In-First-Out (FIFO) block to buffer a packet having a size, comprising:
means for receiving a data frame including the packet and overhead information, and to extract the packet from the data frame;
means for buffering having a plurality of memory locations to store the packet in a FIFO configuration;
means for managing, in response to detecting a buffer low packet condition, to stall reads of the packet from the buffer; the managing means to compare the counted skip cycles to a count constant to determine a skip count status, wherein the managing means, in response to not detecting the buffer low packet condition, restarts reads of the packet from the buffer; and means for timing to count skip cycles corresponding to the overhead information.

22. The FIFO block of claim 21 wherein the timing means includes a skip counter.

23. The FIFO block of claim 21 wherein the buffering means includes a read pointer to point at a read location from which the packet is read, a write pointer to point to a write location at which the packet is currently written, and a start pointer to point to a last start of the packet; and
wherein the managing means detecting the buffer low packet condition includes determining the buffering means does not include a full packet, the read pointer is pointing to the start pointer, and the counted skip cycles are less than the count constant.

24. The FIFO block of claim 23 wherein reads of the packet from the buffering means are restarted in response to determining the buffering means includes a full packet.

25. The FIFO block of claim 23 wherein reads of the packet from the buffering means are restarted in response to determining the counted skip cycles is equal to the count constant.

26. A transceiver comprising:
a Wide Area Network Interface Sublayer (WIS) to add framing to a packet having a size;
a Physical Coding Sublayer (PCSR) to delineate the packet; and
means for transferring the packet between at least two networks having different formats, the means for transferring to stall reads of the packet in response to detecting a buffer low packet condition, wherein said buffer low packet condition occurs after a portion of the packet is stored in a means for buffering.

27. The transceiver of claim 26 wherein the means for transferring comprises;
means for receiving a data frame including the packet and overhead information, and to extract the packet from the data frame;
means for buffering having a plurality of memory locations to store the packet in a FIFO configuration; and
means for managing, in response to detecting the buffer low packet condition, to stall reads of the packet from the buffer.

28. The transceiver of claim 27 wherein the managing means, in response to not detecting the buffer low packet condition, restarts reads of the packet from the buffer.

29. The transceiver of claim 27 wherein the data frame is compatible with a synchronous optical network (SONET).

30. A transceiver comprising:
a Wide Area Network Interface Sublayer (WIS) to add framing to a packet having a size;
a Physical Coding Sublayer (PCSR) to delineate the packet;
means for transferring the packet between at least two networks having different formats, the means for transferring to stall reads of the packet in response to detecting a buffer low packet condition:
means for receiving a data frame including the packet and overhead information, and for extracting the packet from the data frame;
means for buffering having a plurality of memory locations to store the packet in a FIFO configuration;
means for managing, in response to detecting the buffer low packet condition, to stall reads of the packet from the buffer, wherein the managing means, in response to not detecting the buffer low packet condition, restarts reads of the packet from the buffer; and
means for timing to count skip cycles corresponding to the overhead information; and
the managing means to compare the counted skip cycles to a count constant to determine a skip count status.

31. The transceiver of claim 30 wherein the timing means includes a skip counter.

32. The transceiver of claim 30 wherein the buffering means includes a read pointer to point at a read location from which the packet is read, a write pointer to point to a write location at which the packet is currently written, and a start pointer to point to a last start of the packet; and
wherein the managing means detecting the buffer low packet condition includes determining the buffering means does not include a full packet, the read pointer is pointing to the start pointer, and the counted skip cycles are less than the count constant.

33. The transceiver of claim 32 wherein reads of the packet from the buffering means are restarted in response to determining the buffering means includes a full packet.

34. The transceiver of claim 32 wherein reads of the packet from the buffering means are restarted in response to determining the counted skip cycles is equal to the count constant.

35. A method comprising:
receiving a data frame including a packet and overhead information;
writing the packet into a buffer;
reading the packet out of the buffer in a first-in-first-out scheme;
detecting a low packet condition in the buffer, wherein said buffer low packet condition occurs after a portion of the packet is stored in said buffer; and
stalling reads from the buffer as a function of the buffer low packet condition until at least one full packet is received in the buffer.

36. The method of claim 35 further comprising, in response to determining that the buffer low packet condition is not present, restarting reads from the buffer.

37. The method of claim 35 further comprising determining a start of the packet being written to the buffer; and
wherein writing further includes setting a start pointer to a start location in the buffer at which the start packet is written; and
reading includes setting a read pointer to a read location in the buffer from which data is currently read.

38. The method of claim 37 wherein the buffer low packet condition includes detecting no full packets in the buffer and the read pointer pointing to the start location.

39. The method of claim 38 wherein the buffer low packet condition further includes a skip counter being less than the counter constant.

40. A method comprising:
receiving a data frame including a packet and overhead information;
writing the packet into a buffer;
reading the packet out of the buffer in a first-in-first-out scheme;
detecting a low packet condition in the buffer;
wherein the packet has a size, and detecting the low packet condition includes;
setting a count constant as a function of the packet size;
counting skip cycles as the packet is written into the buffer;
comparing the counted skip cycles to the count constant; and
stalling reads from the buffer as a function of the buffer low packet condition.

41. The method of claim 40 wherein counting cycles includes; determining a start of the packet being written to the buffer; and in response to determining the packet start, resetting a skip timer for counting the cycles;
generating a Kcount representative of the counted cycles; and
comparing the count constant to the Kcount.

* * * * *

UNITED STATES PATENT AND TRADEMARK OFFICE
CERTIFICATE OF CORRECTION

| | |
|---|---|
| PATENT NO. | : 7,362,771 B1 |
| APPLICATION NO. | : 10/158337 |
| DATED | : April 22, 2008 |
| INVENTOR(S) | : William Lo et al. |

It is certified that error appears in the above-identified patent and that said Letters Patent is hereby corrected as shown below:

Column 5, Line 30      Delete second period after ">+kconst"

Column 5, Line 55      Insert -- to -- after "used"

Signed and Sealed this

Twelfth Day of August, 2008

JON W. DUDAS
*Director of the United States Patent and Trademark Office*